(12) United States Patent
Hidaka

(10) Patent No.: US 9,812,094 B2
(45) Date of Patent: Nov. 7, 2017

(54) DISPLAY DEVICE FOR MEASURING INSTRUMENT, MEASURING INSTRUMENT, METHOD OF ANALOGICALLY DISPLAYING MEASURED VALUE, AND PROGRAM OF ANALOGICALLY DISPLAYING MEASURED VALUE

(71) Applicant: MITUTOYO CORPORATION, Kawasaki-shi, Kanagawa (JP)

(72) Inventor: Hiroyuki Hidaka, Miyazaki (JP)

(73) Assignee: MITUTOYO CORPORATION, Kawasaki-shi (JP)

( * ) Notice: Subject to any disclaimer, the term of this patent is extended or adjusted under 35 U.S.C. 154(b) by 272 days.

(21) Appl. No.: 14/683,571

(22) Filed: Apr. 10, 2015

(65) Prior Publication Data
US 2015/0302833 A1    Oct. 22, 2015

(30) Foreign Application Priority Data
Apr. 16, 2014 (JP) .................................. 2014-084220

(51) Int. Cl.
*G09G 5/02* (2006.01)
*G09G 5/37* (2006.01)
*G09G 5/38* (2006.01)
*G01D 7/00* (2006.01)

(52) U.S. Cl.
CPC ............... *G09G 5/37* (2013.01); *G01D 7/002* (2013.01); *G09G 5/02* (2013.01); *G09G 5/38* (2013.01); *G09G 2310/04* (2013.01)

(58) Field of Classification Search
CPC .. G09G 5/37; G09G 5/02; G09G 5/38; G09G 2310/04; G01D 7/002
See application file for complete search history.

(56) References Cited

U.S. PATENT DOCUMENTS

| 7,284,455 | B2 * | 10/2007 | Lee | G01D 13/22 235/103 |
| 8,558,681 | B2 * | 10/2013 | Nishiyama | B60K 35/00 116/288 |
| 8,638,206 | B2 * | 1/2014 | Boutin | B60K 35/00 340/425.5 |
| 9,463,693 | B2 * | 10/2016 | Oishi | B60K 35/00 |

(Continued)

FOREIGN PATENT DOCUMENTS

| JP | 3372793 B2 | 2/2003 |
| JP | 2011113041 A | 6/2011 |

*Primary Examiner* — Abderrahim Merouan
(74) *Attorney, Agent, or Firm* — Oliff PLC

(57) ABSTRACT

A display device for a measuring instrument, includes: a display screen of a graphic display module; and a processing unit for drawing on the display screen a figure changed in position or shape in response to change in measured value, the processing unit is configured to: calculate first coordinates on the display screen based on a pre-changed value of the measured value; draw at least a part of the figure on the display screen based on the first coordinate; calculate second coordinates on the display screen based on a post-changed value of the measured value; acquire as a redrawing region a region on the display screen based on the first coordinates and the second coordinates; and redraw the redrawing region based on a redrawing function for redrawing only a specified region on the display screen.

16 Claims, 14 Drawing Sheets

(56) References Cited

U.S. PATENT DOCUMENTS

| | | | | |
|---|---|---|---|---|
| 2002/0017232 A1* | 2/2002 | Wehner | ............... | B60K 37/02 |
| | | | | 116/284 |
| 2005/0280521 A1* | 12/2005 | Mizumaki | ............... | B60K 35/00 |
| | | | | 340/438 |
| 2007/0285388 A1* | 12/2007 | Ogasawara | ............ | B60K 35/00 |
| | | | | 345/157 |
| 2007/0296724 A1* | 12/2007 | Katoh | ................... | B60K 35/00 |
| | | | | 345/475 |
| 2008/0163811 A1* | 7/2008 | Nakamichi | ............ | B60K 35/00 |
| | | | | 116/62.4 |
| 2011/0179990 A1* | 7/2011 | Zecirovic | ............... | G01D 13/26 |
| | | | | 116/288 |
| 2012/0223964 A1* | 9/2012 | Oishi | .................... | B60K 35/00 |
| | | | | 345/629 |
| 2013/0118279 A1* | 5/2013 | Ohno | .................... | G01D 13/20 |
| | | | | 73/866.3 |
| 2013/0174773 A1* | 7/2013 | Nagara | ................. | B60K 37/02 |
| | | | | 116/201 |
| 2014/0072940 A1* | 3/2014 | Wood | .................. | G09B 23/288 |
| | | | | 434/265 |
| 2014/0331161 A1* | 11/2014 | Venkataswamy | ..... | G06F 3/0484 |
| | | | | 715/771 |
| 2015/0264502 A1* | 9/2015 | Aoki | ....................... | H04S 5/005 |
| | | | | 381/17 |
| 2015/0379785 A1* | 12/2015 | Brown, Jr. | ........... | A01B 79/005 |
| | | | | 701/29.1 |
| 2016/0340935 A1* | 11/2016 | Chuang | .................. | H04M 1/00 |

* cited by examiner

DISPLAY DEVICE FOR MEASURING INSTRUMENT, MEASURING INSTRUMENT, METHOD OF ANALOGICALLY DISPLAYING MEASURED VALUE, AND PROGRAM OF ANALOGICALLY DISPLAYING MEASURED VALUE

CROSS-REFERENCE TO RELATED APPLICATION(S)

This application is based upon and claims the benefit of priority from Japanese Patent Application No. 2014-084220, filed on Apr. 16, 2014, the entire contents of which are incorporated herein by reference.

BACKGROUND

1. Field of the Invention

The present invention relates to a display device for displaying a measured value, and in particular, to a technology for analogically displaying a measured value obtained as digital date in real time.

2. Description of the Related Art

In measuring instruments for measuring dimensions, shapes and the like, analog measuring instruments, in which a displacement of a measuring point is enlarged by movement of levers or gears and the displacement amount is read from a pointer on a scale plate, were only mainstream before digital technologies are developed as in today. After that, digital technologies based on semiconductor technologies have been greatly advanced and such digital technologies have been applied to dimension or shape measuring instruments. Also, in terms of detecting principles, as electronic encoders of photoelectric type or capacitance type are developed instead of levers or gears, measuring instruments in which all of detecting and displaying of measured results are digitally performed are developed.

Because such digital measuring instruments display the measured results as numerical values, individual differences in reading or read errors can be greatly reduced to allow a stable and high accurate measurement. In the other hand, however, merits of the analog measuring instruments represented by pointer type are also reappraised. Namely, such digitally displayed numerical values have problems in that instantaneous grasping of a measured result is difficult and additionally because a measured value is meanderingly changed while a measuring point is finely displaced, reading is difficult and grasping of a direction of change, which indicates whether a measured value is being increased or decreased, is also difficult, and the like. Thus, it has been found that analog displaying of pointer type is superior in these respects.

Therefore, digital measuring instruments for analogically displaying a measured value are commercially available. Japanese Patent No. 3372793 discloses a digital and analog display-type dial gage as one example of such digital measuring instruments. The digital and analog display-type dial gage has a dial gage body, a spindle provided to be slidable relative to the dial gauge body, and a liquid crystal display. The liquid crystal display is a custom liquid crystal module having a digital display portion and an analog display portion. A displacement amount of a measuring point provided on a distal end of the spindle is displayed on both of the digital display portion and the analog display portion.

The digital display portion has seven-segmented electrodes for + or − symbol and five digits and a displacement amount of the measuring point is displayed to be directly readable by numerical display. The analog display portion has analog graduation segments, which are analog display graduations and are formed by rod-shaped electrodes arranged to be aligned in parallel to each other, and analog pointer segments, which are pointers for analogically displaying the displacement amount of the measuring point and are formed by a plurality of rod-shaped electrodes arranged to be aligned in parallel to each other, and typically only one analog pointer segment is selectively displayed.

Although grasping of a direction of change in measured value is somewhat facilitated by the analog display portion of the custom liquid crystal module, a mechanical dial gage having an analog indicator constituted of a scale plate and a rotatable pointer allows a measured value to be intuitionally read and thus enjoys a deep-seated popularity even today. To display the analog indicator constituted of the scale plate and the rotatable pointer on a liquid crystal display, a graphic liquid crystal module capable of displaying any figure needs to be used.

However, in a conventional method of displaying the analog indicator constituted of the scale plate and the rotatable pointer on the graphic liquid crystal module, the entire surface of a display screen is sequentially updated. Therefore, an amount of data to be processed for updating of the display screen is enormous, so that it is not easy to rapidly perform updating of the display screen.

JP-A-2011-113041 discloses a display device in which when an analog indicator constituted of a scale plate and a rotatable pointer is displayed on a graphic liquid module, updating of a display screen can be rapidly performed. The display device has a display portion having a plurality of display pixels arranged thereon, a drawing memory for storing each pixel data to be imparted to the plurality of display pixels, and a controller adapted to store the pixel data into the drawing memory by sequentially reading out base image data for displaying the scale plate and pointer image data from a ROM (Read Only Memory) at every frame and then recording the read-out data into the drawing memory. On the basis of the last pointer region in which the pointer is displayed in the last frame, the controller records a partial region of the base image data encompassing the last pointer region as base image data for the current frame. In this configuration, the entire base image data for the current frame is not overwritten, but a partial data thereof based on the pointer region in the last frame is overwritten. Accordingly, a load in recording and processing the base image data for the current frame is reduced and also a recording speed is increased.

In the display device disclosed in JP-A-2011-113041, updating of data on the drawing memory from the last frame to the current frame undergoes an intermediate state (state D shown in FIG. 3 of JP-A-2011-113041 or the like), so that memory-overwriting processing needs to be performed twice. Therefore, there is a room for further speed-up of updating of the display screen.

Further, in the display device disclosed in JP-A-2011-113041, the pointer image data has to be recorded into the ROM at every predetermined angle of the pointer. Namely, a large amount of image data needs to be previously recorded into the ROM.

In the display device disclosed in JP-A-2011-113041, memory-overwriting processing has to be performed twice or a large amount of image data has to be previously recorded even if other graphic display modules, such as a graphic organic EL (Electro Luminescence) module, are used instead of the graphic liquid crystal module.

SUMMARY

An object of the present invention is to provide a display device for a measuring instrument, a measuring instrument, a method of analogically displaying a measured value and a program, in which when a measured value is analogically displayed on a display screen of a graphic display module, updating of the display screen can be speeded up and an amount of image data to be previously recorded can be reduced.

According to a first aspect of the invention, there is provided a display device for a measuring instrument, including: a display screen of a graphic display module; and a processing unit for drawing on the display screen a figure changed in position or shape in response to change in measured value, the processing unit is configured to: calculate first coordinates on the display screen based on a pre-changed value of the measured value; draw at least a part of the figure on the display screen based on the first coordinate; calculate second coordinates on the display screen based on a post-changed value of the measured value; acquire as a redrawing region a region on the display screen based on the first coordinates and the second coordinates; and redraw the redrawing region based on a redrawing function for redrawing only a specified region on the display screen.

According to a second aspect of the invention, in the display device for the measuring instrument according to the first aspect, the figure is a triangular pointer rotating in response to change in measured value or a rectangular bar changed in length in response to change in measured value.

According to a third aspect of the invention, in the display device for the measuring instrument according to the second aspect, the figure is the triangular pointer; the display screen includes a plurality of pixels arranged in a lattice shape along a longitudinal direction and a transversal direction perpendicular to each other, the region on the display screen acquired as the redrawing region is a rectangular region encompassing the first coordinates, which are coordinates of apexes of the triangle corresponding to the pre-changed value of the measured value, and the second coordinates, which are coordinates of the apexes of the triangle corresponding to the post-changed value of the measured value, and a longitudinal side and a transversal side of the rectangular region are respectively parallel to the longitudinal direction and the transversal direction.

According to a fourth aspect of the invention, in the display device for the measuring instrument according to the third aspect, the display device further includes an operating portion operated by a user, a rotation position of the triangular pointer is reset to a zero-position based on an operation of the user on the operating portion, and a direction pointed by the triangular pointer at the zero-position is parallel to the longitudinal direction or the transversal direction.

According to a fifth aspect of the invention, in the display device for the measuring instrument according to any one of the first aspect to the third aspect, the display device further includes an operating portion operated by a user, the display screen overlaps and displays the figure with a scale plate selected by an operation of the user on the operating portion, and the processing unit is configured to: calculate the first coordinates based on the pre-changed value of the measured value and a parameter corresponding to the scale plate; and calculate the second coordinates based on the post-changed value of the measured value and the parameter.

According to a sixth aspect of the invention, in the display device for the measuring instrument according to any one of the first aspect to the third aspect, the display device further includes an operating portion operated by a user, the display screen displays an analog indicator including the figure and a scale plate, and the display screen enlarges and displays a part of the analog indicator based on an operation of the user on the operating portion.

According to a seventh aspect of the invention, in the display device for the measuring instrument according to any one of the first aspect to the fourth aspect, the display device further includes a posture sensor for detecting a posture of the display screen, and the display screen displays an analog indicator including the figure and a scale plate based on an output of the posture sensor.

According to an eighth aspect of the invention, in the display device for the measuring instrument according to any one of the first aspect to the third aspect, the display device further includes an operating portion operated by a user, the display screens overlaps and displays the figure with a scale plate, the scale plate includes: a plurality of graduations arranged along a graduation arrangement direction; and a colored region formed along the graduation arrangement direction and having a color different from a background color of the scale plate, and a position of an end portion of the colored region in the graduation arrangement direction is changed in the graduation arrangement direction based on an operation of the user on the operating portion.

According to a ninth aspect of the invention, in the display device for the measuring instrument according to any one of the first aspect to the eighth aspect, a color of the figure is changed when the measured value is changed to exceed a threshold.

According to a tenth aspect of the invention, there is provided a measuring instrument including: a display device for a measuring instrument including: a display screen of a graphic display module; and a processing unit for drawing on the display screen a figure changed in position or shape in response to change in measured value, the processing unit is configured to: calculate first coordinates on the display screen based on a pre-changed value of the measured value; draw at least a part of the figure on the display screen based on the first coordinate; calculate second coordinates on the display screen based on a post-changed value of the measured value; acquire as a redrawing region a region on the display screen based on the first coordinates and the second coordinates; and redraw the redrawing region based on a redrawing function for redrawing only a specified region on the display screen; a contact component adapted to come in contact with a workpiece; and a displacement sensor for detecting a displacement of the contact component, and the measured value is calculated based on an output of the displacement sensor.

According to a eleventh aspect of the invention, there is provided a method of analogically displaying a measured value for drawing on a display screen of a graphic display module a figure changed in position or shape in response to change in measured value, including: calculating first coordinates on the display screen based on a pre-changed value of the measured value; drawing at least a part of the figure on the display screen based on the first coordinate; calculating second coordinates on the display screen based on a post-changed value of the measured value; acquiring as a redrawing region a region on the display screen based on the first coordinates and the second coordinates; and redrawing the redrawing region based on a redrawing function for redrawing only a specified region on the display screen.

According to a twelfth aspect of the invention, there is provided a recording medium for storing a program of analogically displaying a measured value for drawing on a display screen of a graphic display module a figure changed in position or shape in response to change in measured value, the program causing a computer to execute the steps of: calculating first coordinates on the display screen based on a pre-changed value of the measured value; drawing at least a part of the figure on the display screen based on the first coordinate; calculating second coordinates on the display screen based on a post-changed value of the measured value; acquiring as a redrawing region a region on the display screen based on the first coordinates and the second coordinates; and redrawing the redrawing region based on a redrawing function for redrawing only a specified region on the display screen.

According to the present invention, a display device for a measuring instrument, a measuring instrument, a method of analogically displaying a measured value and a program can be provided, in which when a measured value is analogically displayed on a display screen of a graphic display module, updating of the display screen can be speeded up and an amount of image data to be previously recorded can be reduced.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Embodiment 1

Embodiments of the present invention will be now described with reference to the accompanying drawings.

Figure 1:
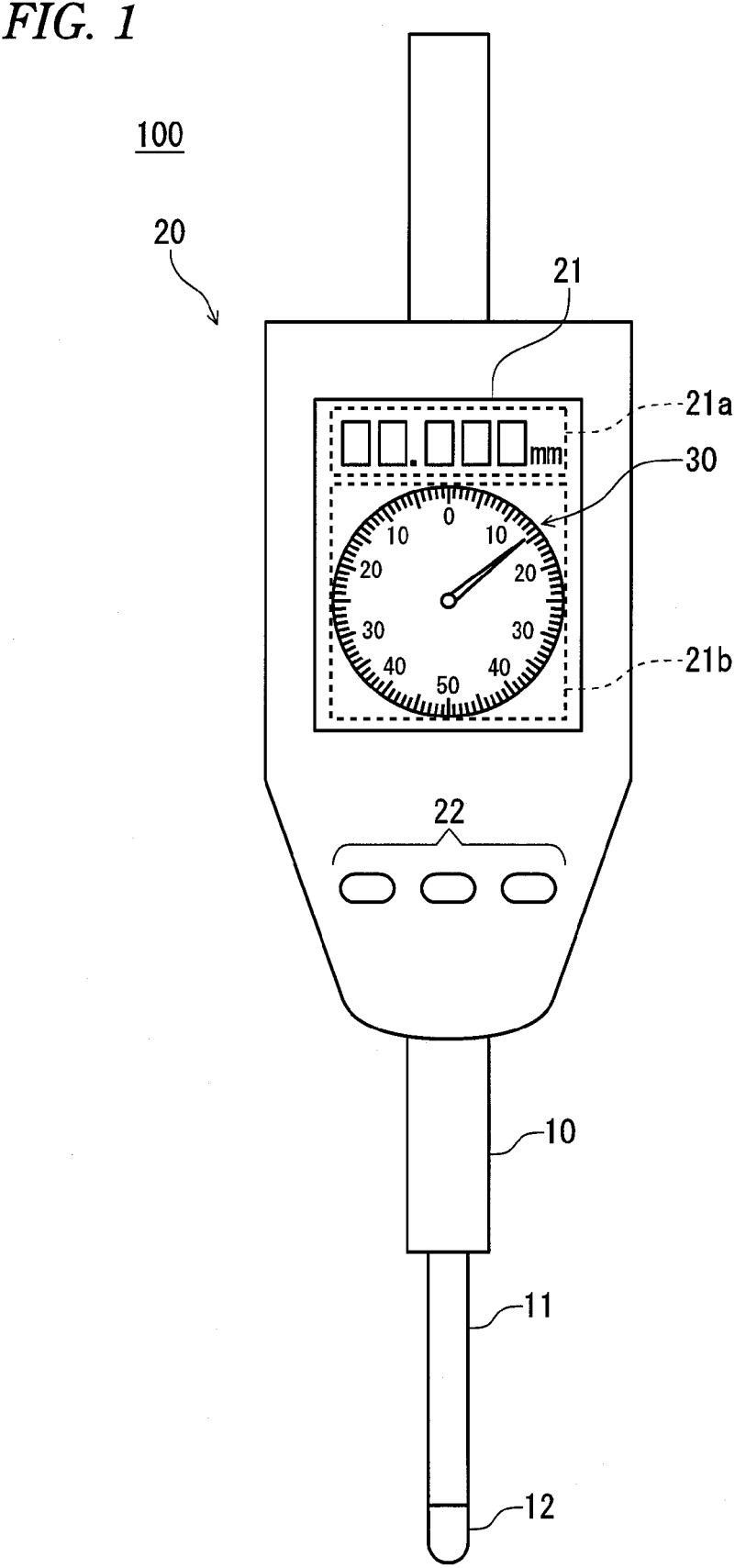
FIG. 1 is a front view of a measuring instrument according to an embodiment 1.

FIG. 1 is a front view of a measuring instrument 100 according to an embodiment 1. Hereinafter, although a case where the measuring instrument 100 is a digital indicator (dial gauge) will be described, the measuring instrument 100 is not limited to the indicator (dial gauge). The measuring instrument 100 includes a stem 10, a spindle 11 arranged to be slidable relative to the stem 10, a measuring point 12 provided on a distal end of the spindle 11 and a display device 20 for displaying as a measured value a displacement of the measuring point 12. The measuring point 12 is a contact component adapted to come in contact with a workpiece, which is an object to be measured.

The display device 20 includes a display screen 21 of a graphic display module and operation switch group 22. The display screen 21 has a plurality of pixels arranged in a lattice shape along a longitudinal direction and a transversal direction, which are perpendicular to each other. The display screen 21 has a numerical value displaying region 21a for displaying a measured value by a numerical value and an analog indicator displaying region 21b for displaying the measured value by an analog indicator 30. Alternatively, the entire display screen 21 may be the analog indicator displaying region 21b. The operation switch group 2 is an operation portion to be operated by a user.

Figure 2:
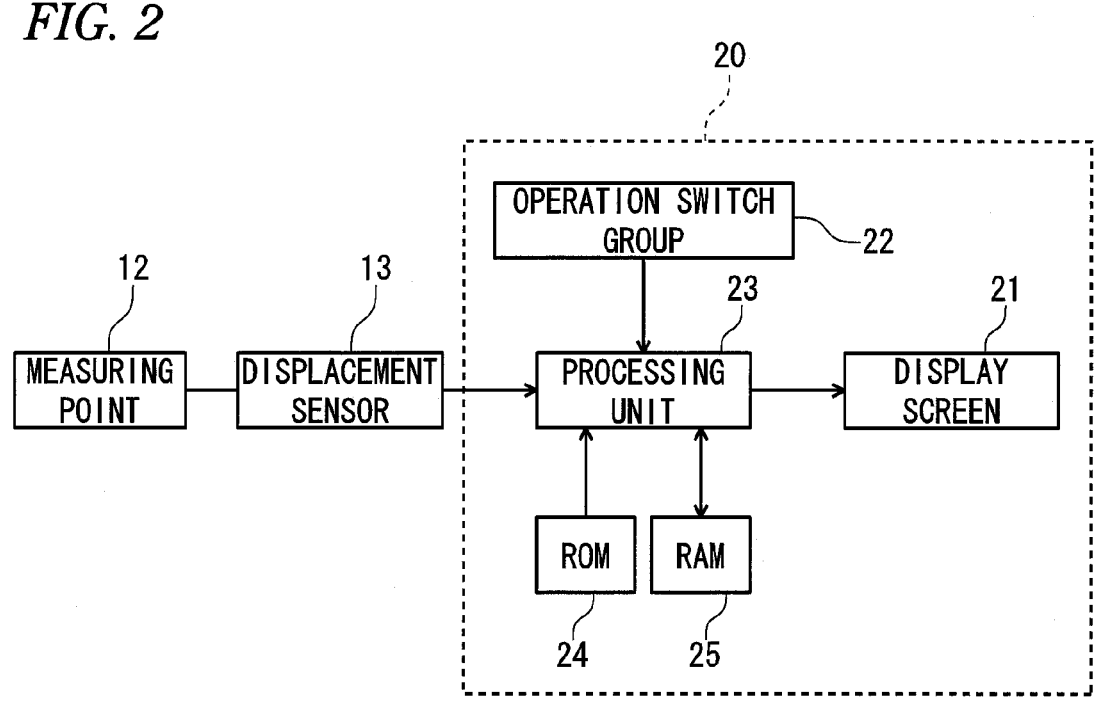
FIG. 2 is a schematic view of a measuring/displaying system equipped in the measuring instrument according to the embodiment 1.

FIG. 2 is a schematic view of a measuring/displaying system equipped in the measuring instrument 100. The measuring/displaying system includes the measuring point 12, a displacement sensor 13 for detecting a displacement of the measuring point 12 and the display device 20. The display device 20 has the display screen 21, the operation switch group 22, a processing unit 23, a ROM (Read Only Memory) 24 and a RAM (Random Access Memory) 25. The processing unit 23 performs arithmetic processing and controlling of each element of the display device 20. The processing unit 23 includes a CPU (Central Processing Unit) equipped with a graphic controller and a drawing memory for storing each pixel data of the plurality of pixels of the display screen 21.

The processing unit 23 displays a measured value, which is calculated based on an output of the display sensor 13, on the display screen 21. Specifically, the processing unit 21 displays the measured value in the numerical value displaying region 21a and also displays the analog indicator 30, which represents the measured value, in the analog indicator displaying region 21b of the display screen 21. Alternatively, the measured value may be calculated by the processing unit 22 or may be calculated by other arithmetic units. Programs, functions, data and the like are previously stored in the ROM 24. The RAM 25 provided an operation region to the processing unit 23 and also is stored with data calculated by the processing unit 23.

Figure 3:
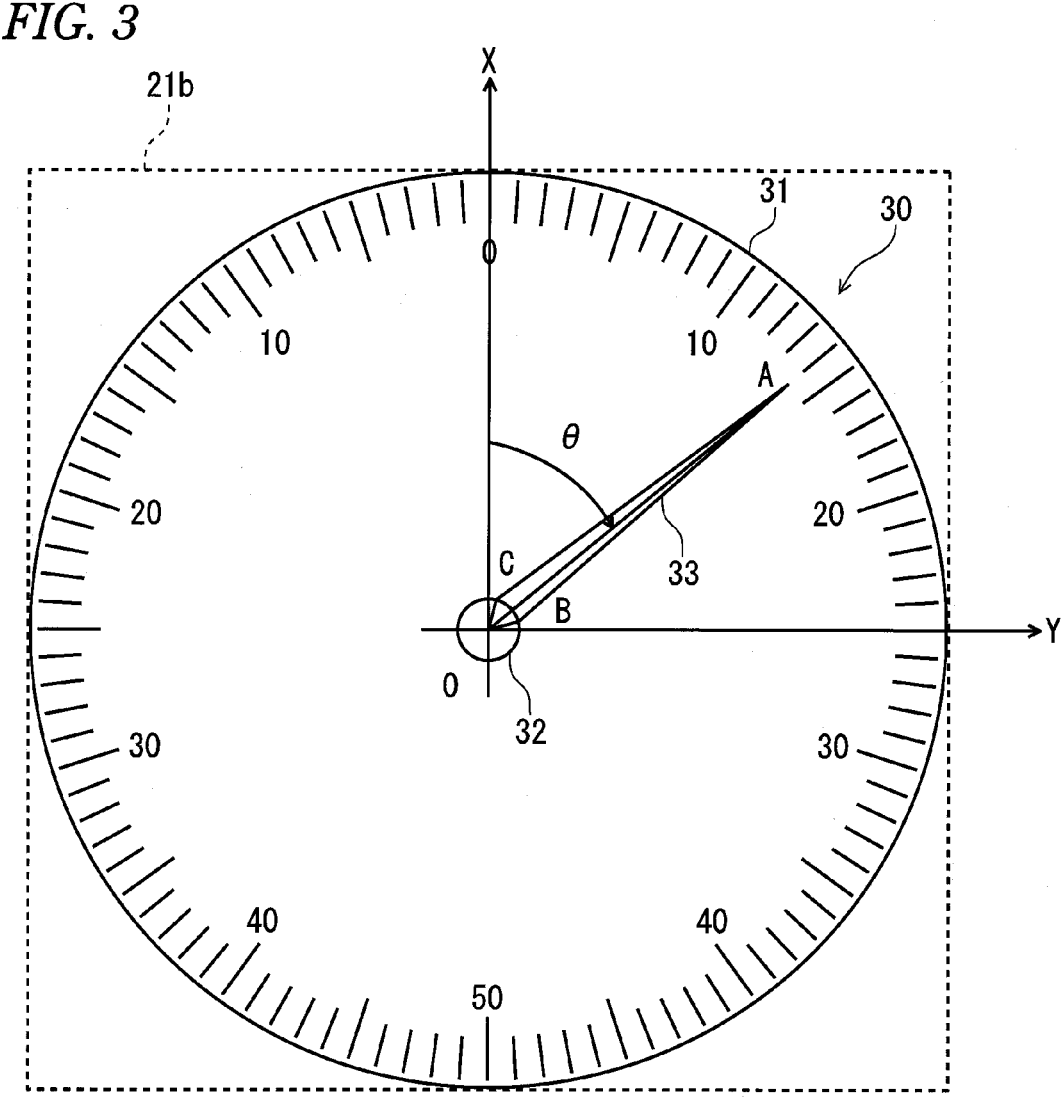
FIG. 3 is a view showing an analog indicator displayed on a display screen of the measuring instrument according to the embodiment 1.

FIG. 3 is a view showing the analog indicator 30 displayed on the display screen 21. The display screen 21 analogically displays the measured value by the analog indicator 30. An X-axis and a Y-axis are set with respect to the display screen 21. The X-axis and the Y-axis are respectively parallel to the longitudinal direction and the transversal direction, which are arrangement directions of the plurality of pixels of the display screen 21, and are perpendicular to each other at an origin point O. Also, the analog indicator displaying region 21 is a rectangular region and a longitudinal side and a transversal side of the rectangular region are respectively parallel to the X-axis and the Y-axis. The X-axis is parallel to a sliding direction of the spindle 11.

The analog indicator 20 has a circular scale plate 31, a center circle 32 and a pointer 33. The scale plate 31 can be also referred to as a dial. The center of the scale plate 31 and the center of the center circle 32 are coincided with the origin point O. On a peripheral edge of the scale plate, a plurality of graduations and a plurality of numerical values are arranged along a circumferential direction thereof. The pointer 33 is rotated about the origin point O in response to change in measured value. Namely, the pointer 33 is a figure changed in position in response to change in measured value. The pointer 33 may be also referred to as an indicator changed in position in response to change in measured value. A user can read a measured value based on the pointer 33 and the graduations.

Herein, the pointer 33 is of a triangle having apexes A~C. In response to change in measured value, the apex A is moved on a circular circumference about the origin point O and the apexes B and C are moved on the center circle 32. A radius R of the circular circumference, on which the apex A is moved, is larger than a radius r of the center circle 32, on which the apexes B and C are moved. A rotation angle θ of the pointer 33 is an angle defined by a half line OA and the X-axis. Meanwhile, magnitudes of an angle AOB and an angle AOC are α. Accordingly, when coordinates (X-coordinates and Y-coordinates) of the apexes A~C are respectively referred to as coordinates A~C, the coordinates A~C are respectively represented by the following equations.

[Equation 1]

$$A=(R\cos\theta, R\sin\theta) \qquad (1)$$

[Equation 2]

$$B=(r\cos(\theta+\alpha), r\sin(\theta+\alpha)) \qquad (2)$$

[Equation 3]

$$C=(r\cos(\theta-\alpha), r\sin(\theta-\alpha)) \qquad (2)$$

Herein, if the entire analog indicator displaying region 21b is redrawn upon updating of the display screen 21, an amount of date which has to be processed by the processing unit 23 for updating is increased, thereby causing an updating speed to be slow down. Therefore, when a general-purpose CPU, which does not have so high performance, is used as the CPU of the processing unit 23 and the entire analog indicator displaying region 21b is redrawn by a graphic controller equipped in the general-purpose CPU, movement of the pointer 33 is displayed like in a frame advance mode.

When a high performance CPU is used as the CPU of the processing unit 22 or a dedicated graphic chip is provided separately from the CPU, the pointer 33 can be displayed to be smoothly moved even if the entire analog indicator display region 21b is redrawn upon updating of the display screen 21. However, if the high performance CPU or dedicated graphic chip is used, manufacturing costs of the display device 20 is increased.

Therefore, in a method of analogically displaying a measured value, which is executed by the display device 20, a part of the analog indicator displaying region 21b is redrawn upon updating of the display screen 21, thereby realizing a speed-up of updating. In the following, the method of analogically displaying the measured value, which is executed by the display device 20, will be described in detail.

Figure 4:
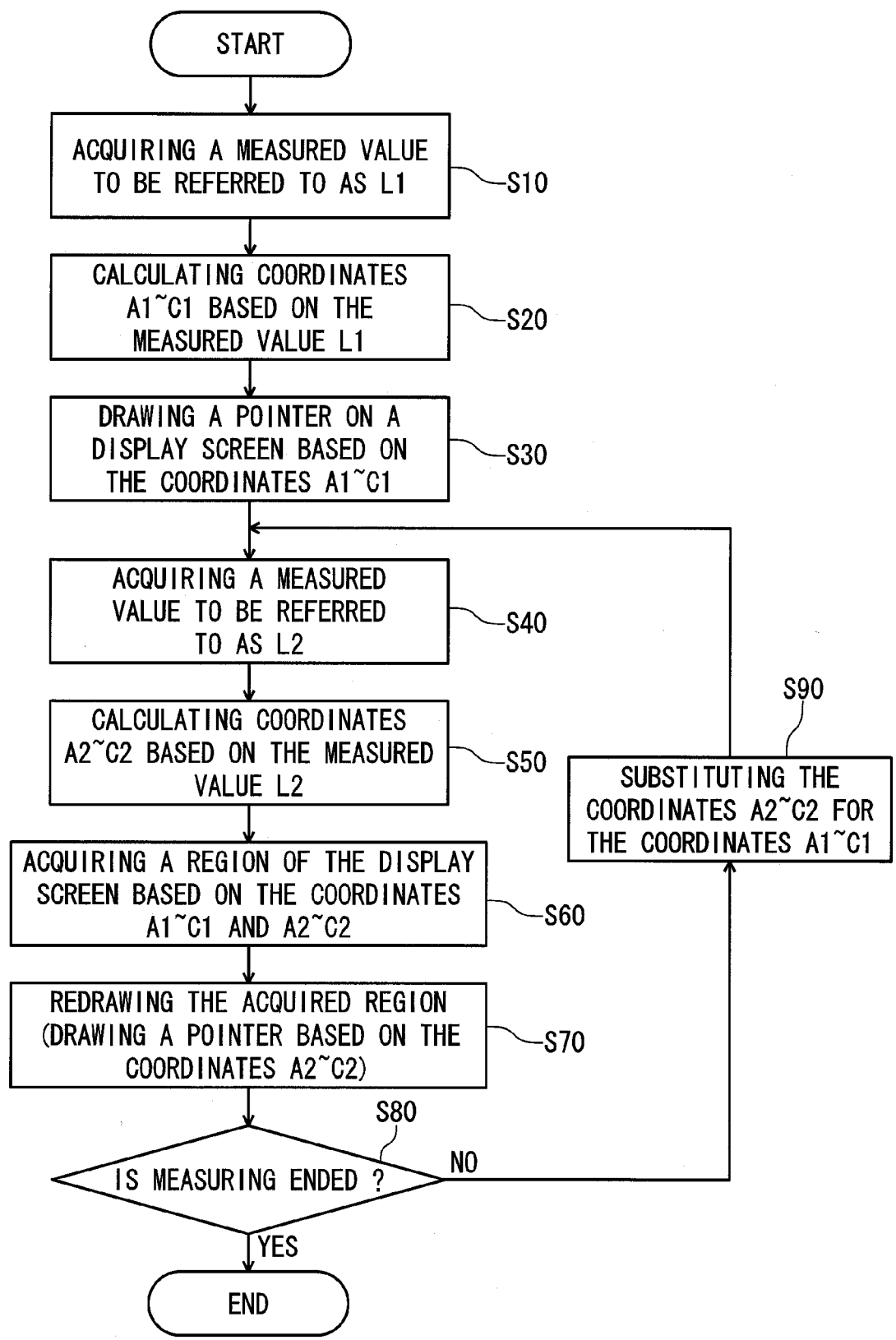
FIG. 4 is a flow chart of a method of analogically displaying a measured value, executed by the measuring instrument according to the embodiment 1.

FIG. 4 is a flow chart of the method of analogically displaying the measured value, executed by the display device 20. The method of analogically displaying the measured value will be described with reference to FIG. 4. The processing unit 23 is operated based on programs stored in the ROM 24 so that the display device 20 executes the method of analogically displaying the measured value. The method of analogically displaying the measured value includes steps S10~S90.

The processing unit 23 acquires a measured value to be referred to as L1 (Step S10). The processing unit 23 calculates a value θ1 of the rotation angle θ of the pointer 33 from the measured value L1 using a function stored in the ROM 24 and then calculates coordinates A1~C1 on the display screen 21 from the value e1 (Step S20). The coordinates A1~C1 can be calculated by substituting the value θ1 for the rotation angle θ in the above equations (1)~(3).

Figure 5:
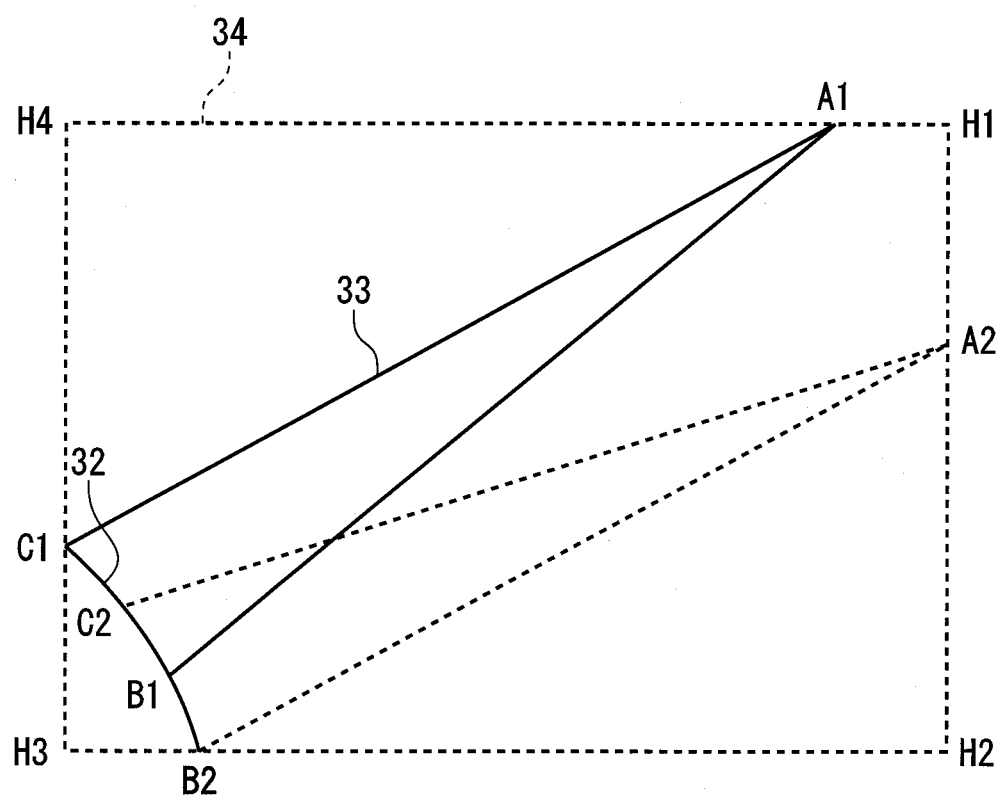
FIG. 5 is a concept view explaining a redrawing region acquired in the method of analogically displaying the measured value according to the embodiment 1.

The processing unit 23 draws the pointer 33 on the display screen 21 based on the coordinates A1~C1 (Step S30). Specifically, as shown in FIG. 5, the processing unit 23 draws a line segment connecting the coordinate A1 with the coordinate B1 (line segment AB in FIG. 3), a line segment connecting the coordinate A1 with the coordinate C1 (line segment AC in FIG. 3), a line segment connecting the coordinate B1 with the coordinate C1 (line segment BC in FIG. 3) and a surface (triangle region) surrounded by the three line segments by a predetermined color. The line segments and the surface may be drawn by different colors. The coordinates A1~C1 are stored in the RAM 25.

The processing unit 23 acquires a measured value to be referred to as L2 (Step S40). The measured value L2 is acquired after the measured value L1. Typically, because the measured value L2 is different from the measured value L1, the measured value L1 may be referred to as a pre-changed value of the measured value and the measured value L2 may be referred to as a post-changed value of the measured value. The processing unit 23 calculates a value θ2 of the rotation angle θ of the pointer 33 from the measured value L2 using a function stored in the ROM 24 and then calculates coordinates A2~C2 on the display screen 21 from the value θ2 (Step S50). The coordinates A2~C2 can be calculated by substituting the value θ2 for the rotation angle θ in the above equations (1)~(3).

The processing unit 23 acquires a region on the display screen 21 as a redrawing region 34 based on the coordinates A1~C1 and A2~C2 using a function stored in the ROM 24 (Step S60). Referring to FIG. 5, the redrawing region 34 is a minimum rectangular region, which has a longitudinal side and a transversal side parallel to the X-axis and the Y-axis, respectively, and encompasses the coordinates A1~C1 and A2~C2.

Specifically, the processing unit 23 acquires coordinates H1~H4 of four apexes in the redrawing region 34. An X-coordinate of the coordinate H1 is the maximum value in X-coordinates of the coordinates A1~C1 and A2~C2. A Y-coordinate of the coordinate H1 is the maximum value in Y-coordinates of the coordinates A1~C1 and A2~C2. An X-coordinate of the coordinate H2 is the minimum value in X-coordinates of the coordinates A1~C1 and A2~C2. A Y-coordinate of the coordinate H2 is the maximum value in Y-coordinates of the coordinates A1~C1 and A2~C2. An X-coordinate of the coordinate H3 is the minimum value in X-coordinates of the coordinates A1~C1 and A2~C2. A Y-coordinate of the coordinate H3 is the minimum value in Y-coordinates of the coordinates A1~C1 and A2~C2. An X-coordinate of the coordinate H4 is the maximum value in X-coordinates of the coordinates A1~C1 and A2~C2. A Y-coordinate of the coordinate H4 is the minimum value in Y-coordinates of the coordinates A1~C1 and A2~C2.

Alternatively, the processing unit 23 may acquire coordinates H1 and H3 of two apexes located on a first diagonal line of the redrawing region 34 or may acquire coordinates H2 and H3 of two apexes located on a second diagonal line of the redrawing region 34.

The processing unit 23 redraws the redrawing region 34 based on a redrawing function which is stored in the ROM 24 for redrawing only a specified region on the display screen 21 (Step S70). In this time, the processing unit 23 erases the pointer 33, which has been already drawn, from the redrawing region 34 and then draws a pointer 33 in the redrawing region 34 based on the coordinates A2~C2. Specifically, the processing unit 23 erases three line segments connecting the coordinates A1~C1 with each other and the surrounded surface, and then draws three line segments connecting the coordinates A2~C2 with each other and the surrounded surface by a predetermined color (see FIG. 5).

The processing unit 23 determines whether or not measuring is ended (Step S80). If measuring is ended (YES in Step S80), the display device 20 ends the method of analogically displaying the measured value. If measuring is not ended (NO in Step S80), the RAM 25 stores values of the coordinates A2~C2 as values of the coordinates A1~C1 (Step S90). After Step S90, the method returns to Step S40.

According to the present embodiment, the coordinates A1~C1 are calculated based on the pre-changed value of the measured value (measured value L1), the coordinates A2~C2 are calculated based on the post-changed value of the measured value (measured value L2), the redrawing region 34 is acquired based on the coordinates A1~C1 and A2~C2, and the redrawing region 34 is redrawn using the redrawing function for redrawing only the specified region on the display screen 21. Therefore, only a region of the analog indicator displaying region 21b, which is changed in response to change in measured value, can be redrawn. By doing so, updating of the display screen 21 can be speeded up as compared to the case where the entire analog indicator displaying are 21b is redrawn. As a result, even if the general-purpose CPU, which does not have so high performance, is used as the CPU of the processing unit 23, the pointer 33 can be displayed to be smoothly moved, not as the frame advance mode.

More specifically, the redrawing function is a function for rewriting only pixel date, which is related to the specified region on the display screen 21, of pixel date stored in the drawing memory equipped in the processing unit 23. Because the redrawing region 34 which is redrawn by the redrawing function is narrow, an amount of date to be rewritten is small. As a result, recording to the drawing memory is speeded up and in turn drawing is speeded up. Meanwhile, the drawing memory may be referred to as a graphic RAM.

In addition, because the redrawing region 34 is acquired based on the coordinates A1~C1 calculated based on the measured value L1 and the coordinates A2~C2 calculated based on the measured value L2, both of the pointer 33 corresponding to the measured value L1 and the pointer 33 corresponding to the measured value L2 are encompassed in the redrawing region 34. Accordingly, updating of data in the drawing memory from the last frame to the current frame can be completed by performing only once memory-overwriting processing. As a result, updating of the display screen 21 can be further speeded up.

Also, because the redrawing region 34 is redrawn based on the redrawing function, pointer image data at every predetermined angle of the pointer 33 does not need to be recorded in the ROM 24. Accordingly, an amount of image data, which has to be previously recorded in the ROM 24, can be reduced.

Further, because the pointer 33 is a triangle adapted to rotate in response to change in measured value, coordinates of apexes of the pointer 33 can be calculated from trigonometrical functions described in the equations (1)~(3), thereby allowing the pointer 33 to be simply drawn.

Further, because the pointer 33 is a triangle adapted to rotate in response to change in measured value and the redrawing region 34 is a rectangular region encompassing the coordinates A1~C1 and A2~C2 so that a longitudinal side and a transversal side of the redrawing region 34 are respectively parallel to the longitudinal direction and the transversal direction, which are arrangement directions of the plurality of pixels of the display screen 21, the redrawing region 34 is very small when a direction (direction of a vector OA) pointed by the pointer 33 is the longitudinal direction or the transversal direction. Namely, when the rotation angle θ is defined as shown in FIG. 3, if the rotation angle θ of the pointer 33 is close to 0°, 90°, 180° and 270°, an area of the redrawing region 34 is very small. Accordingly, when the rotation angle θ of the pointer 33 is close to these angles, updating of the display screen 21 can be further speeded up.

In addition, a case where a rotation position of the pointer 33 is reset to a zero-position by measuring a gauge block having a dimension as close as possible to that of a workpiece and then the workpiece is measured can be contemplated. In this case, the rotation position of the pointer 33 is reset to the zero-position (i.e., a position where the rotation angle θ becomes 0°) based on an operation of a user on the operation switch group 22. A direction pointed by the pointer 33 at the zero-position is parallel to the longitudinal direction, which is the arrangement direction of the plurality of pixels of the display screen 21. Therefore, during measuring of the workpiece, the rotation angle θ of the pointer 33 is close to 0° and thus a direction pointed by the pointer 33 is generally parallel to the longitudinal direction. As a result, during measuring of the workpiece, an area of the redrawing region 34 becomes very small and thus updating of the display screen 21 can be further speeded up. Alternatively, the direction pointed by the pointer 33 at the zero-position may be parallel to the transversal direction, which is the arrangement direction of the plurality of pixels of the display screen 21.

Embodiment 2

Now, an embodiment 2 will be described. In the following description, features which are common with those of the embodiment 1 can be omitted. In the embodiment 2, a scale plate of the analog indicator 30 is configured to be changeable.

Figure 6:
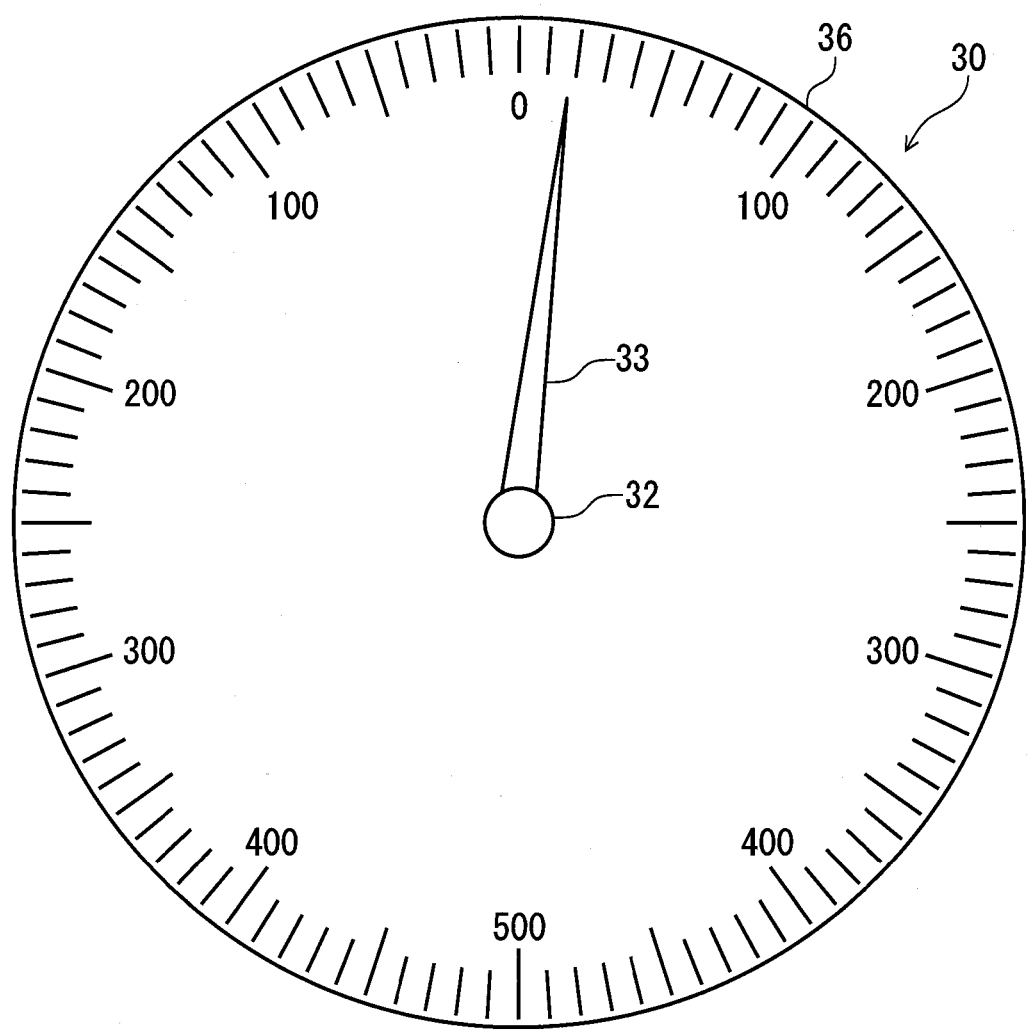
FIG. 6 is a view showing an analog indicator displayed on a display screen of a measuring instrument according to an embodiment 2.

A scale plate is selected based on an operation of a user on the operation switch group 22. If a scale plate 31 is selected, as shown in FIG. 3, the display screen 21 displays the scale plate 31 and the pointer 33 in an overlapped state. If a scale plate 36 is selected, as shown in FIG. 6, the display screen 21 displays the scale plate 36 and the pointer 33 in an overlapped state.

In Step S20 of the case where the scale plate 31 is selected, the processing unit 23 calculates a value θ1 of the rotation angle θ of the pointer 33, based additionally on parameters corresponding to the scale plate 31 and then calculates coordinates A1~C1 on the display screen 21 from the value θ1. In Step S50 of the case where the scale plate 31 is selected, the processing unit 23 calculates a value θ2 of the rotation angle θ of the pointer 33, based additionally on the parameters corresponding to the scale plate 31 and then calculates coordinates A2~C2 on the display screen 21 from the value θ2.

In Step S20 of the case where the scale plate 36 is selected, the processing unit 23 calculates a value θ1 of the rotation angle θ of the pointer 33, based additionally on parameters corresponding to the scale plate 36 and then calculates coordinates A1~C1 on the display screen 21 from the value θ1. In Step S50 of the case where the scale plate 36 is selected, the processing unit 23 calculates a value θ2 of the rotation angle θ of the pointer 33, based additionally on the parameters corresponding to the scale plate 36 and then calculates coordinates A2~C2 on the display screen 21 from the value θ2.

In the example as described, because the maximum graduation '500' of the scale plate 36 is ten times the maximum graduation '50' of the scale plate 31, the value θ1 and the value θ2 when the scale plate 36 is selected are respectively one tenth of the value θ1 and the value θ2 when the scale plate 31 is selected. According to the present embodiment, a displaying range when a measured value is analogically displayed can be changed.

Embodiment 3

Now, an embodiment 3 will be described. In the following description, features which are common with those of the embodiment 1 can be omitted. In the embodiment 3, a part of the analog indicator 30 is enlarged and displayed based on an operation of a user.

Figure 7:
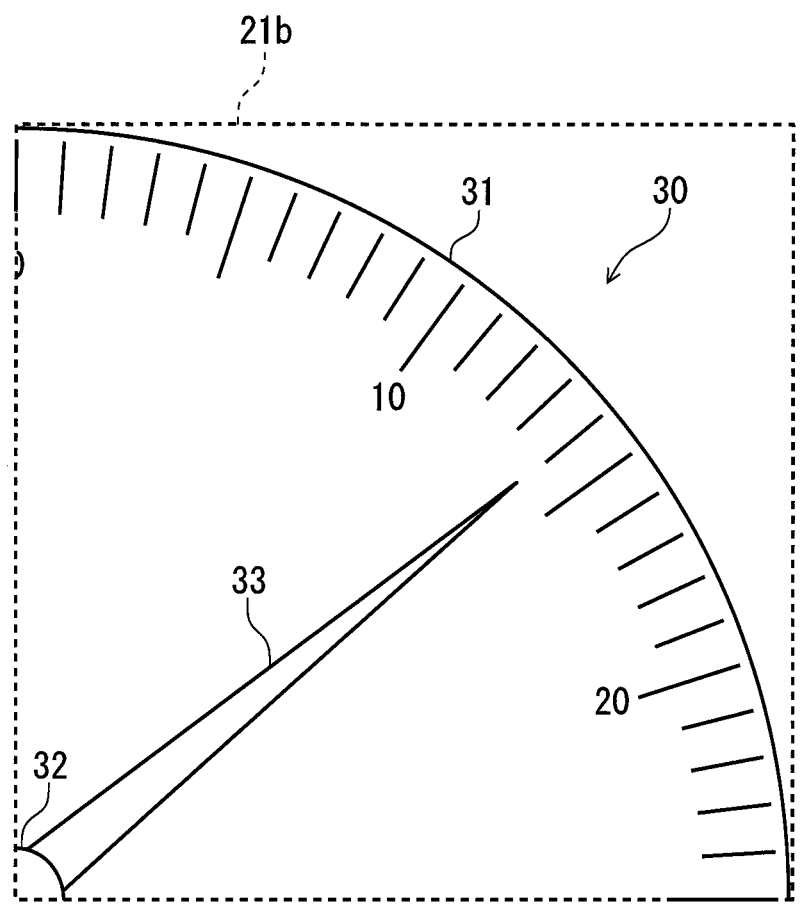
FIG. 7 is a view showing an analog indicator displayed on a display screen of a measuring instrument according to an embodiment 3.

Referring to FIG. 7, the display screen 21 enlarges and displays a part of the analog indicator 30 in the analog indicator displaying region 21b based on an operation of a user on the operation switch group 22. In this case, the user may select a part, which is to be enlarged and displayed, by the operation switch group 22 or the processing unit 23 may select a part, which is to be enlarged and displayed, based on the rotation angle θ of the pointer 33. According to the present embodiment, because a part of the analog indicator 30 is enlarged and displayed, a very little change in position of the pointer 33 can be grasped.

Embodiment 4

Now, an embodiment 4 will be described. In the following description, features which are common with those of the embodiment 1 can be omitted. In the embodiment 4, the analog indicator 30 is displayed based on a posture of the display screen 21.

Figure 8:
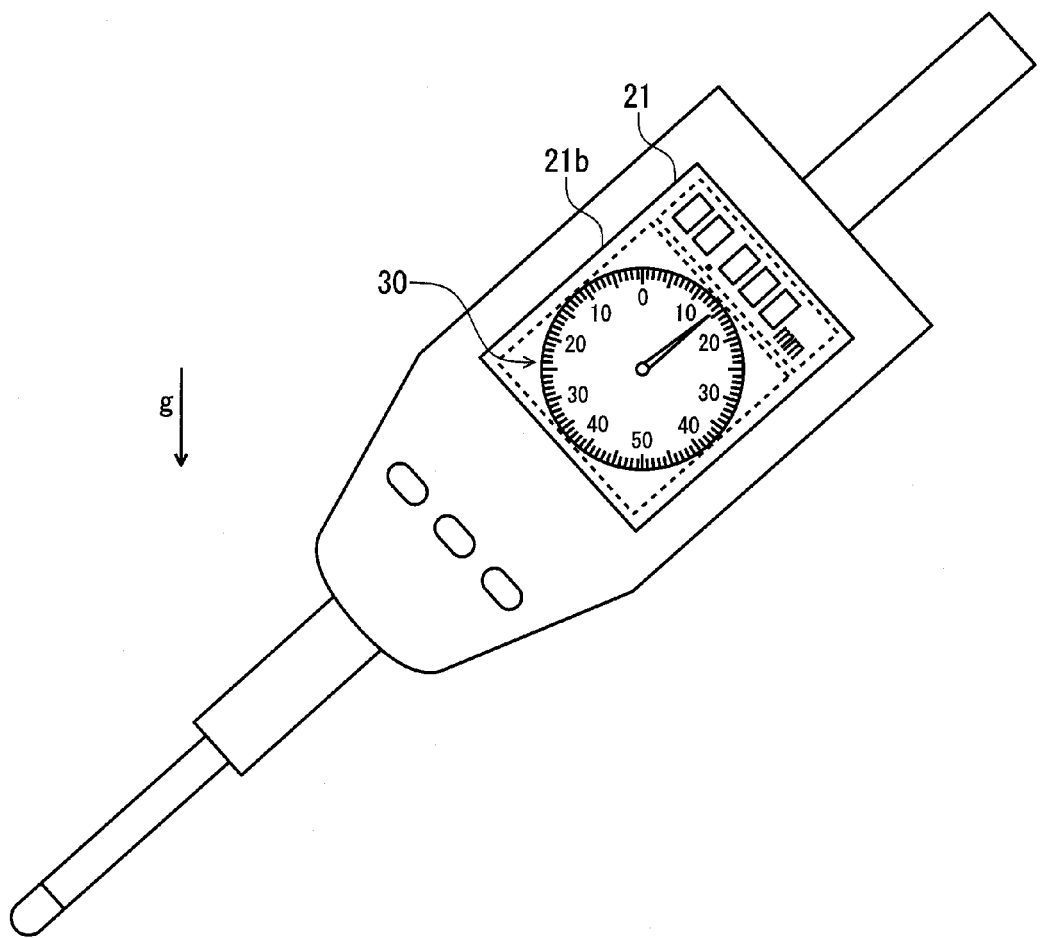
FIG. 8 is a front view of a measuring instrument according to an embodiment 4.

Referring to FIG. 8, a measuring instrument 400 according to the embodiment 4 can display an analog indicator 30 so that the analog indicator 30 is not inclined with respect to a vertical direction g even if a display screen 21 is inclined with respect to the vertical direction g.

Figure 9:
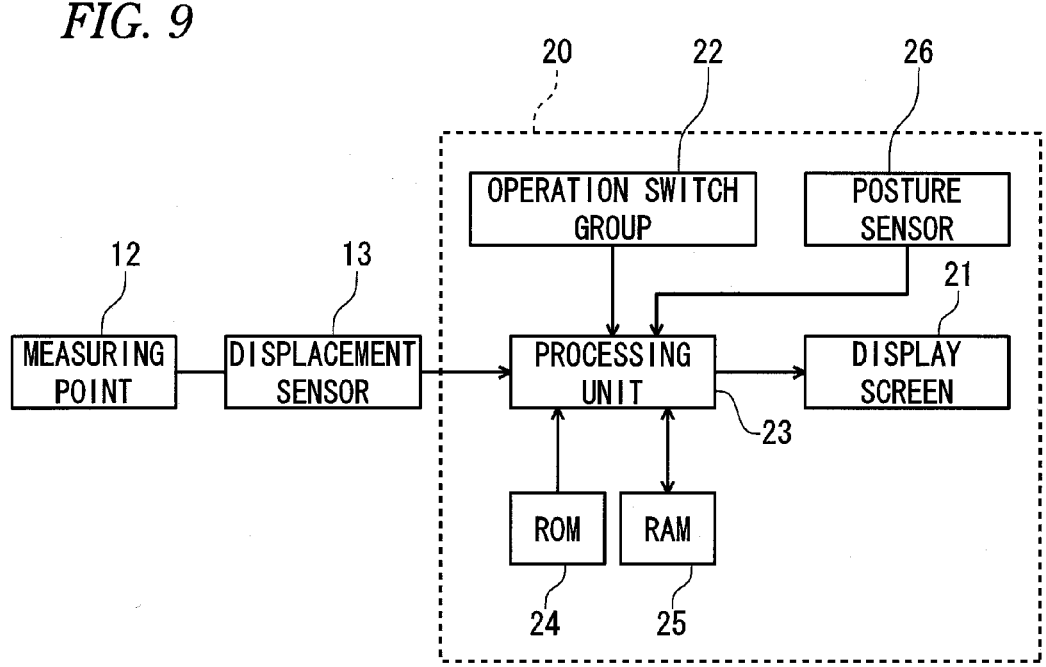
FIG. 9 is a schematic view of a measuring/displaying system equipped in the measuring instrument according to the embodiment 4.

FIG. 9 is a schematic view of a measuring/displaying system equipped in the measuring instrument 400. In the measuring/displaying system equipped in the measuring instrument 400, a posture sensor 26 for detecting a posture of the display screen 21 is provided. The displays screen 21 displays the analog indicator 30 based on an output of the posture sensor 26. According to the present embodiment, the analog indicator 30 can be always displayed not to be inclined with respect to the vertical direction g, and therefore a user can easily read a measured value from the analog indicator 30.

Embodiment 5

Now, an embodiment 5 will be described. In the following description, features which are common with those of the embodiment 1 can be omitted. In the embodiment 5, the scale plate 31 of the analog indicator 30 includes a colored region and a range of the colored region is adapted to be changeable.

Figure 10:
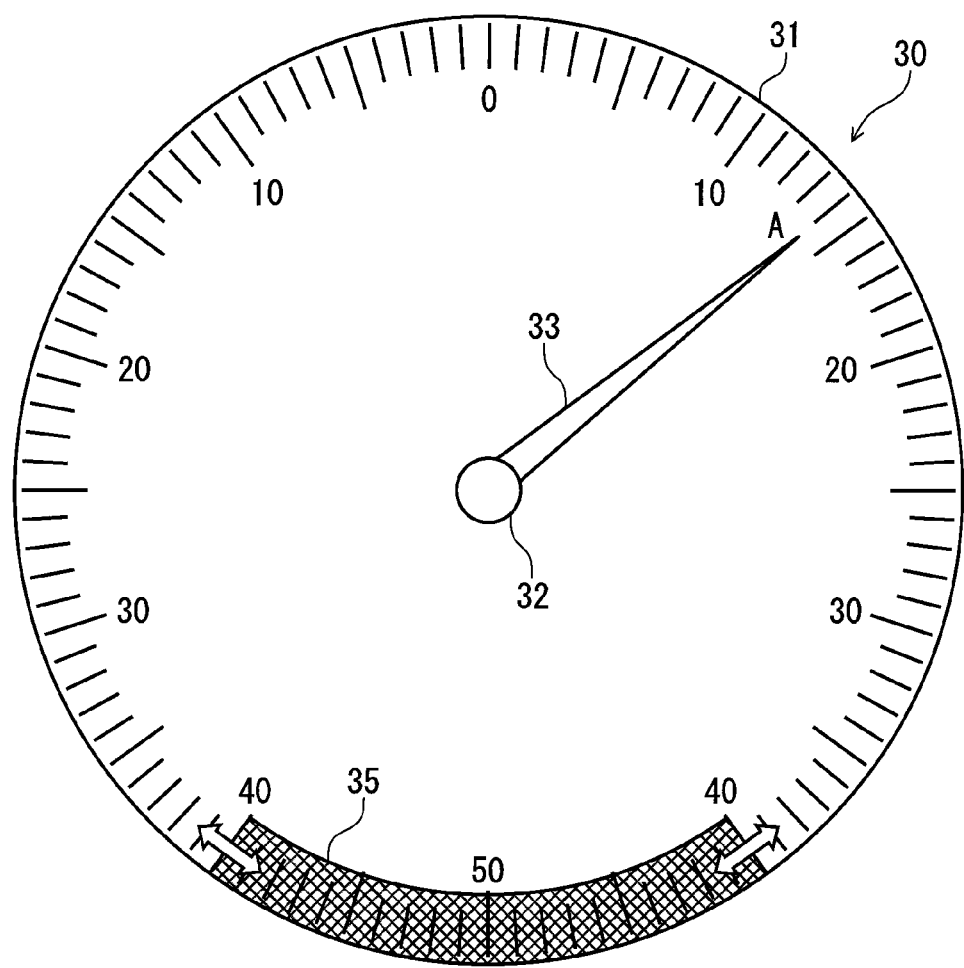
FIG. 10 is a view showing an analog indicator displayed on a display screen of a measuring instrument according to an embodiment 5.

As shown in FIG. 10, the display screen 21 displays the scale plate 31 and the pointer 33. On a peripheral edge of the scale plate 31, the colored region 35 is formed along a circumferential direction thereof, which is an arrangement direction of a plurality of graduations. A color of the colored region 35 is different from a background color of the scale plate 31. The colored region 35 is a region indicating, for example, that a measured value is out of a dimensional tolerance. Namely, when the pointer 33 points the colored region 35, the measured value is out of the dimensional tolerance. For example, the colored region 35 is formed from a left graduation '40' through a graduation '50' to a right graduation '40'.

According to the present embodiment, positions of end portions of the colored region 35 in the circumferential direction is changed along the circumferential direction based on an operation of a user on the operation switch group 22. For example, based on an operation of a user on the operation switch group 22, the right end portion of the colored region 35 is moved to a position of a right graduation '30' and the left end portion of the colored region 35 is moved to a position of a left graduation '30'. Therefore, the user can set the colored region 35 depending on dimensional tolerances.

Embodiment 6

Now, an embodiment 6 will be described. In the following description, features which are common with those of the embodiment 1 or 5 can be omitted. In the embodiment 6, a color of the pointer 33 is changed when a measured value is changed to exceed a threshold.

Figure 11:
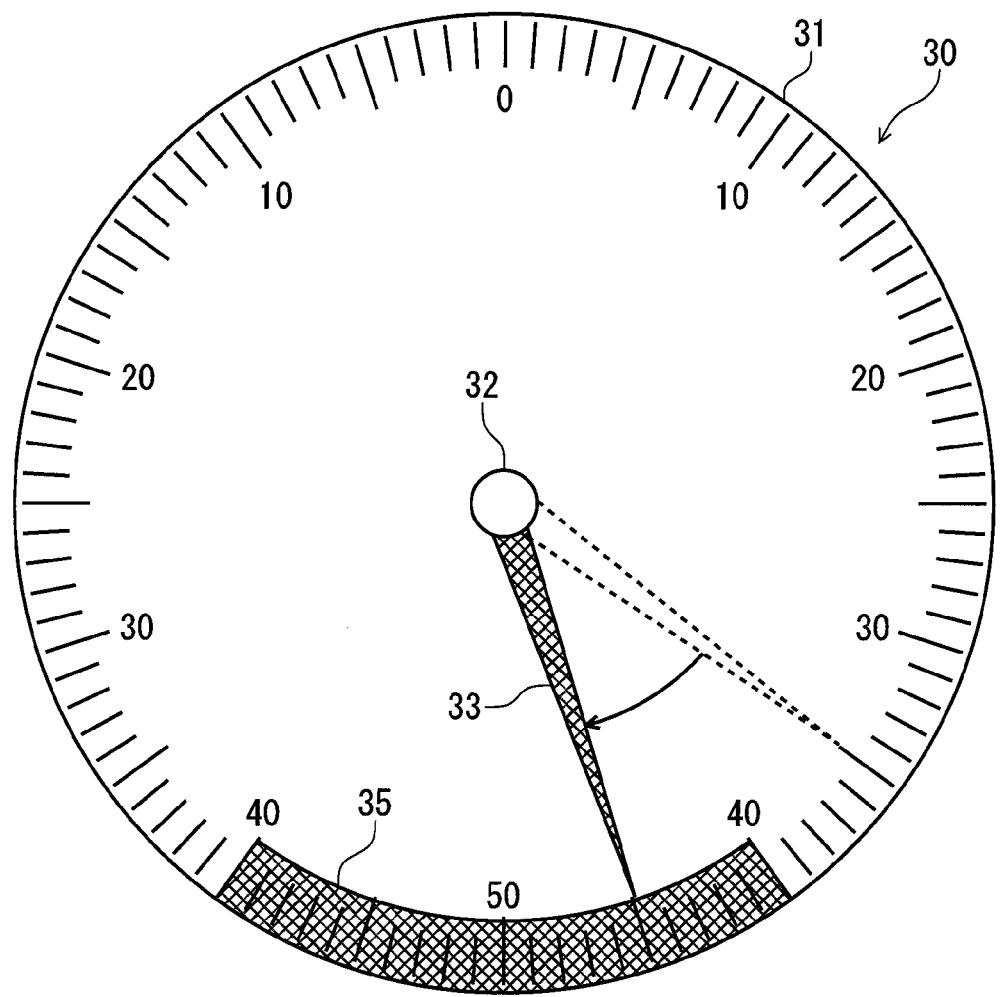
FIG. 11 is a view showing an analog indicator displayed on a display screen of a measuring instrument according to an embodiment 6.

Referring to FIG. 11, for example, when a threshold 40 is set, a color of the pointer 33 is changed if a measured value is changed to exceed the threshold 40. By doing so, a user can find, from change in color of the pointer 33, that the measured vale is changed to exceed the threshold. For example, when values corresponding to both end portions of the colored region 35 indicating that a measured value is out of a dimensional tolerance are set as thresholds, the user can find, from change in color of the pointer 33, that a measured value is changed from within the dimensional tolerance to out of the dimensional tolerance. Alternatively, only the pointer 33, which is changed in color when a measured value is changed to exceed a threshold, may be provided without providing the colored region 35.

Embodiment 7

Now, an embodiment 7 will be described. In the following description, features which are common with those of the embodiment 1 can be omitted. An analog indicator according to the embodiment 7 analogically displays a measured value using a bar having a length changed in response to change in measured value.

Figure 12:
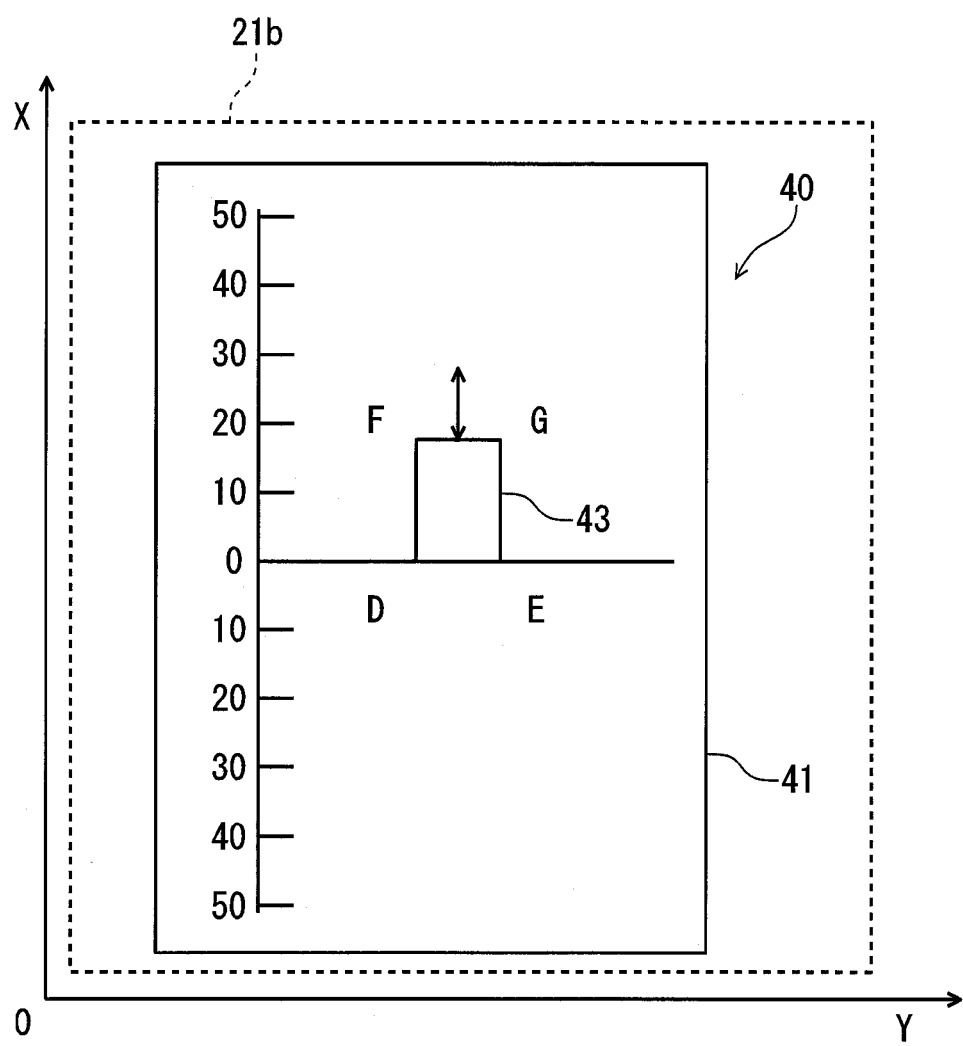
FIG. 12 is a view showing an analog indicator displayed on a display screen of a measuring instrument according to an embodiment 7.

Referring to FIG. 12, instead of the analog indicator 30, an analog indicator 40 is displayed in an analog indicator displaying region 21b according to the embodiment 7. The analog indicator 40 has a scale plate 41 and a bar 43. On the scale plate 41, a plurality of graduations and a plurality of numerical values are arranged in parallel to an X-axis. The bar 43 is stretched or contracted in parallel to the X-axis in response to change in measured value. Namely, the bar 43 is a figure changed in shape in response to change in measured value. The bar 43 may be also referred to as an indicator changed in length in response to change in measured value. A user can read a measured value based on the bar 43 and the graduations.

Herein, the bar 43 is of a rectangle having apexes D~G. Longitudinal sides (side DF and side EG) of the bar 43 are parallel to the X-axis and transversal sides (side DE and side FG) of the bar 43 are parallel to a Y-axis. The apexes D and E are fixed points. X-coordinates of the apexes D and E are coincide with an X-coordinate of a graduation '0'. Contrarily, the apexes F and G are moved in parallel to the X-axis in respond to change in measured value. Accordingly, when coordinates (X-coordinates and Y-coordinates) of the apexes D~G are respectively referred to as coordinates D~G, the coordinates D~G are respectively represented by the following equations.

[Equation 4]
$$D = (X0, Y0) \quad (4)$$

[Equation 5]
$$E = (X0, Y1) \quad (5)$$

[Equation 6]
$$F = (f(L) + X0, Y0) \quad (6)$$

[Equation 7]
$$G = (f(L) + X0, Y1) \quad (6)$$

Herein, f(L) is a function of a measured value L and X0, Y0, X1 and Y1 are constants. For example, the function f(L) is proportional to the measured value L.

Next, a method of analogically displaying a measured value according to the present embodiment will be described.

Step S10 is the same as that of the embodiment 1. The processing unit 23 calculates a coordinate G1 on the display screen 21 from a measured value L1 using a function stored in the ROM 24, and then calculates coordinates E and F1 from coordinates D and G1 using a rectangular function stored in the ROM 24 (Step S20). The coordinates G1 can be calculated by substituting the measured value L1 for the measured value L in the above equation (7). The coordinate D is previously stored in the ROM 24. An X-coordinate of the coordinate E is equal to an X-coordinate of the coordinate D and a Y-coordinate of the coordinate E is equal to a Y-coordinate of the coordinate G1. An X-coordinate of the coordinate F1 is equal to an X-coordinate of the coordinate G1 and a Y-coordinate of the coordinate F1 is equal to a Y-coordinate of the coordinate D.

Figure 13:
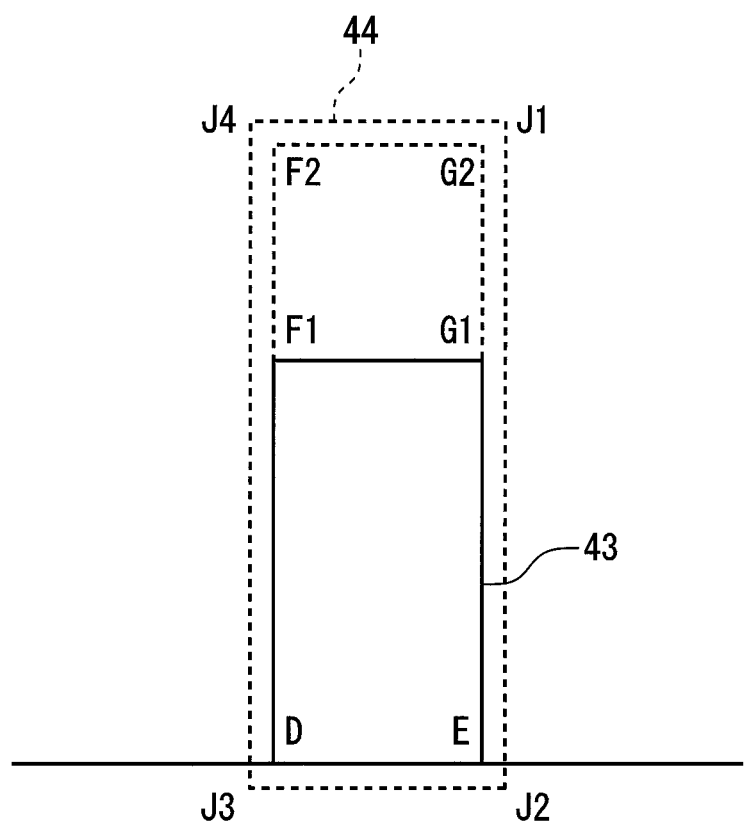
FIG. 13 is a concept view explaining a redrawing region acquired in a method of analogically displaying a measured value according to the embodiment 7.

The processing unit 23 draws the bar 43 on the display screen 21 based on the coordinates D, E, F1 and G1 (Step S30). Specifically, as shown in FIG. 13, the processing unit 23 draws a line segment connecting the coordinate D with the coordinate F1 (line segment DF in FIG. 12), a line segment connecting the coordinate E with the coordinate G1 (line segment EG in FIG. 12), a line segment connecting the coordinate F1 with the coordinate G1 (line segment FG in FIG. 12), a line segment connecting the coordinate D with the coordinate E (line segment DE in FIG. 12) and a surface (rectangular region) surrounded by the four line segments by a predetermined color. The line segments and the surface may be drawn by different colors. The coordinates F1 and G1 are stored in the RAM 25.

Step S40 is the same as that of the embodiment 1. The processing unit 24 calculates a coordinate G2 on the display screen 21 from a measured value L2 using the function stored in the ROM 24, and then calculates coordinates E and F2 from coordinates D and G2 using the rectangular function stored in the ROM 24 (Step S50). The coordinates G2 can be calculated by substituting the measured value L2 for the measured value L in the above equation (7). An X-coordinate of the coordinate F2 is equal to an X-coordinate of the coordinate G2 and a Y-coordinate of the coordinate F2 is equal to the Y-coordinate of the coordinate D.

The processing unit 23 acquires a region on the display screen 21 as a redrawing region 44 based on the coordinates D, E, F1, G1, F2 and G2 using a function stored in the ROM 24 (Step S60). Referring to FIG. 13, the redrawing region 44 is a minimum rectangular region, which has a longitudinal side and a transversal side parallel to the X-axis and the Y-axis, respectively, and encompasses the coordinates D, E, F1, G1, F2 and G2.

Specifically, the processing unit 23 acquires coordinates J1~J4 of four apexes in the redrawing region 44. An X-coordinate of the coordinate J1 is the maximum value in X-coordinates of the coordinates E, G1 and G2. A Y-coordinate of the coordinate J1 is Y1. An X-coordinate of the coordinate J2 is the minimum value in X-coordinates of the coordinates E, G1 and G2. A Y-coordinate of the coordinate J2 is Y1. An X-coordinate of the coordinate J3 is the minimum value in X-coordinates of the coordinates D, F1 and F2. A Y-coordinate of the coordinate J3 is Y0. An X-coordinate of the coordinate J4 is the maximum value in X-coordinates of the coordinates D, F1 and F2. A Y-coordinate of the coordinate J4 is Y0.

Alternatively, the processing unit 23 may acquire coordinates J1 and J3 of two apexes located on a first diagonal line of the redrawing region 44 or may acquire coordinates J2 and J4 of two apexes located on a second diagonal line of the redrawing region 44.

The processing unit 23 redraws the redrawing region 44 based on a redrawing function which is stored in the ROM 24 for redrawing only a specified region on the display screen 21 (Step S70). In this time, the processing unit 23 erases the bar 43, which has been already drawn, from the redrawing region 44 and then draws a bar 43 in the redrawing region 44 based on the coordinates D, E, F2 and G2. In the example shown in FIG. 13, the processing unit 23 erases four line segments connecting the coordinates D, E, F1 and G1 with each other and the surrounded surface, and then draws four line segments connecting the coordinates D, E, F2 and G2 with each other and the surrounded surface by a predetermined color.

Step S80 is the same as that of the embodiment 1. If measuring is not ended (NO in Step S80), the RAM 25 stores values of the coordinates F2 and G2 as values of the coordinates F1 and G1 (Step S90). After Step S90, the method returns to Step S40.

According to the present embodiment, the coordinates F1 and G1 are calculated based on a pre-changed value of the measured value (measured value L1), the coordinates F2 and G2 are calculated based on a post-changed value of the measured value (measured value L2), the redrawing region 44 is acquired based on the coordinates F1, G1, F2 and G2, and the redrawing region 44 is redrawn using the redrawing function for redrawing only the specified region on the display screen 21. Therefore, only a region of the analog indicator displaying region 21*b*, which is changed in response to change in measured value, can be redrawn.

In addition, because the redrawing region 44 is acquired based on the coordinates F1 and G1 calculated based on the measured value L1 and the coordinates F2 and G2 calculated based on the measured value L2, both of the bar 43 corresponding to the measured value L1 and the bar 43 corresponding to the measured value L2 are encompassed in the redrawing region 44. Accordingly, updating of data in the drawing memory from the last frame to the current frame can be completed by performing only once memory-overwriting processing.

Also, because the redrawing region 44 is redrawn based on the redrawing function, bar image data at every predetermined length of the bar 43 does not need to be recorded in the ROM 24.

Further, because the bar 43 is a rectangle having a length changed in response to change in measured value, coordinates of apexes of the bar 43 can be simply calculated (e.g., the equations (4)~(7) or Steps S20 and S50), thereby allowing the bar 43 to be simply drawn.

In the foregoing description, the coordinates E and F of two apexes on the second diagonal line of the rectangular bar 43 are calculated from the coordinates D and G of two apexes on the first diagonal line of the bar 43. Contrarily, the coordinates D and G may be calculated from the coordinates E and F. Alternatively, the coordinates D and E may be previously stored in the ROM 24, and then in Step S20, the coordinates F1 and D1 may be calculated from the measured value L1 and the equations (6) and (7) and in Step S50, the coordinates F2 and D2 may be calculated from the measured value L2 and the equations (6) and (7). In addition, the bar 43 may be of a shape (e.g., parallelogram) other than the rectangle.

Embodiment 8

Now, an embodiment 8 will be described. In the following description, features which are common with those of the embodiment 7 can be omitted. In the analog indicator 40 according to the embodiment 7, graduations '10', '20' or the like are arranged on both sides of a graduation '0' and the bar 43 can extend to both sides of the graduation '0', whereas in an analog indicator according to the embodiment 8, graduations '10', '20' or the like are arranged on only one side of a graduation '0' and a bar can extend to only one side of the graduation '0'.

Figure 14:
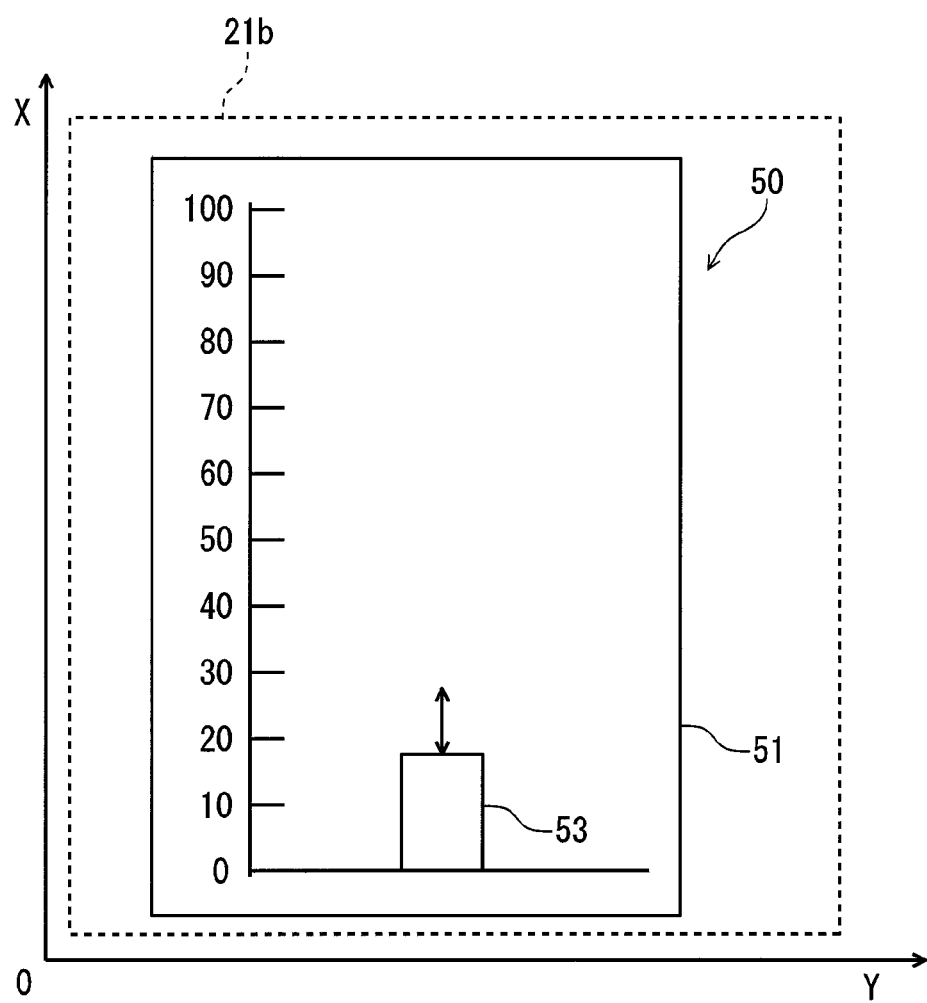
FIG. 14 is a view showing an analog indicator displayed on a display screen of a measuring instrument according to an embodiment 8.

Referring to FIG. 14, the analog indicator 50 according to the embodiment 8 has a scale plate 51 and a bar 53. On the scale plate 51, a plurality of graduations and a plurality of numerical values are arranged in parallel to an X-axis. The bar 53 is stretched or contracted in parallel to the X-axis in response to change in measured value. Graduations '10'~'100' are arranged above the graduation '0', whereas graduations '10'~'100' are not arranged below the graduation '0'. The bar 53 can extend above the graduation '0', but cannot extend below the graduation '0'.

Meanwhile, the present invention is not limited to the foregoing embodiments and accordingly appropriate modifications thereof can be made without departing from the spirit and scope thereof. For example, the embodiments can be freely combined with each other. Instead of the operation switch group 22 provided on the display device 20, an operating portion of remote controller type may be used.

Also, a measuring instrument, to which the present invention is applied, is not limited to an indicator (dial gauge). The invention can be applied to measuring instruments having a contact component adapted to come in contact with a workpiece, a displacement sensor for detecting a displacement of the contact component and a graphic display module for analogically displaying a measured value calculated based on an output of the displacement sensor. For example, the measuring instruments include a micrometer, a vernier caliper, a height gauge, a depth gauge, and a test indicator (lever-type dial gauge). Also, the invention may be also applied to displaying a waveform in a surface roughness measuring instrument. In this case, the figure drawn on the display screen 21 by the processing unit 23 is a curved line representing the waveform.

The present invention may be embodied as a program for executing on a computer the method of analogically displaying the measured value according to each embodiment.

In the foregoing example, the program can be stored using various types of non-transitory computer readable media and supplied to a computer. The non-transitory computer readable mediums include various types of tangible storage media. Examples of non-transitory computer readable mediums include magnetic recording media (e.g., flexible disk, magnetic tape and hard disk drive), magneto-optical recording media (e.g., magneto-optical disk), CD-ROM (Read Only Memory), CD-R, CD-R/W, semiconductor memories (e.g., mask ROM, PROM (Programmable ROM), EPROM (Erasable PROM), flash ROM, RAM (Random Access Memory)). Also, the program may be supplied to a computer by various types of transitory computer readable media. Examples of transitory computer readable media include electrical signals, optical signals and electromagnetic waves. The transitory computer readable media can supply the program to the computer via wired communication channels, such as electric wires and optical fibers, or wireless communication channels.

What is claimed is:

1. A display device for a measuring instrument comprising:
    a display screen; and
    a processor or circuit coupled to the display screen, the processor or circuit being configured to:
        receive a first measured value;
        calculate first coordinates for drawing, on the display screen, a figure that is based on the first measured value;
        draw on the display screen, based on the first coordinates, a frame that includes a figure that is based on the first measured value;
        receive a second measured value;
        calculate second coordinates for drawing, on the display screen, a figure that is based on the second measured value;
        acquire coordinates of a redrawing region, which is a region on the display screen that is based on the first coordinates and the second coordinates, the size of the redrawing region being smaller than the size of the drawn frame; and execute a redrawing function for redrawing only a portion of the drawn frame based on the calculated second coordinates.

2. The display device for the measuring instrument according to claim 1, wherein the figure that is based on the first measured value is a triangular pointer that rotates in response to change in between the first and the second measured values or a rectangular bar that changes in length in response to change in between the first and the second measured values.

3. The display device for the measuring instrument according to claim 2, wherein:

the figure that is based on the first measured value is the triangular pointer;

the display screen includes a plurality of pixels arranged in a lattice shape along a longitudinal direction and a transversal direction perpendicular to each other;

the redrawing region is a rectangular region on the display screen encompassing the first coordinates, which are coordinates of apexes of a triangle corresponding to the first measured value, and the second coordinates, which are coordinates of apexes of a triangle corresponding to the second measured value; and a longitudinal side and a transversal side of the rectangular region on the display screen are respectively parallel to the longitudinal direction and the transversal direction.

4. The display device for the measuring instrument according to claim 3, further comprising an operating portion that is configured to be operated by a user, wherein a rotation position of the triangular pointer is reset to a zero-position based on an operation of the user on the operating portion; and a direction pointed to by the triangular pointer at the zero-position is parallel to the longitudinal direction or the transversal direction.

5. The display device for the measuring instrument according to claim 2, wherein the drawn frame is a visual representation of an analog indicator;

the figure that is based on the first measured value is the triangular pointer; and the triangular pointer is rotated about an origin point of the triangular pointer in response to there being a difference between the first measured value and the second measured value.

6. The display device for the measuring instrument according to claim 1, further comprising an operating portion that is configured to be operated by a user, wherein:

the display screen overlaps and displays the figure that is based on the first measured value with a scale plate selected by an operation of the user on the operating portion; and the processor or circuit is configured to:

calculate the first coordinates based on the first measured value and a parameter corresponding to the scale plate; and calculate the second coordinates based on the second measured value and the parameter.

7. The display device for the measuring instrument according to claim 1, further comprising an operating portion that is configured to be operated by a user, wherein;

the display screen displays an analog indicator including the figure that is based on the first measured value and a scale plate; and the display screen enlarges and displays a part of the analog indicator based on an operation of the user on the operating portion.

8. The display device for the measuring instrument according to claim 1, further comprising a posture sensor for detecting a posture of the display screen, wherein the processor or circuit is further configured to: control the display screen to display an analog indicator and a scale plate based on an output of the posture sensor.

9. The display device for the measuring instrument according to claim 1, further comprising an operating portion that is configured to be operated by a user, wherein:

the display screen overlaps and displays the figure that is based on the first measured value with a scale plate, the scale plate includes:

a plurality of graduations arranged along a graduation arrangement direction; and a colored region formed along the graduation arrangement direction and having a color different from a background color of the scale plate; and a position of an end portion of the colored region in the graduation arrangement direction is changed in the graduation arrangement direction based on an operation of the user on the operating portion.

10. The display device for the measuring instrument according to claim 1, wherein a color of the figure that is based on the first measured value is changed when the difference between the first measured value and the second measured value exceeds a predetermined threshold.

11. The display device for the measuring instrument according to claim 1, wherein the redrawing region encompasses the first and second coordinates, and the redrawing region is a region that is a sub-region of a full image.

12. The display device for the measuring instrument according to claim 1, wherein the figure that is based on the first measured value is a figure that analogically displays the first measured value.

13. The display device for the measuring instrument according to claim 1, wherein the redrawing region is a minimum rectangular region, which has a longitudinal side and a transversal side parallel to an X-axis and a Y-axis, respectively, and encompasses the first coordinates and the second coordinates.

14. A measuring instrument comprising:

a display device for a measuring instrument, including:

a display screen; and a processor or circuit configured to:

receive a first measured value;

calculate first coordinates for drawing, on the display screen, a figure that is based on the first measured value;

draw on the display screen, based on the first coordinates, a frame that includes a figure that is based on the first measured value;

receive a second measured value;

calculate second coordinates for drawing, on the display screen, a figure that is based on the second measured value;

acquire coordinates of a redrawing region, which is a region on the display screen that is based on the first coordinates and the second coordinates, the size of the redrawing region being smaller than the size of the drawn frame; and execute a redrawing function for redrawing only a portion of the drawn frame based on the calculated second coordinates;

a contact component adapted to come into contact with a workpiece; and a displacement sensor for detecting a displacement of the contact component, wherein at least one of the first measured value and the second measured value is calculated based on information output by the displacement sensor.

15. A method comprising:

receiving a first measured value;

calculating first coordinates for drawing, on the display screen, a figure that is based on the first measured value;

drawing on the display screen, based on the first coordinates, a frame that includes a figure that is based on the first measured value;

receiving a second measured value;

calculating second coordinates for drawing, on the display screen, a figure that is based on the second measured value;

acquiring coordinates of a redrawing region, which is a region on the display screen that is based on the first coordinates and the second coordinates, the size of the redrawing region being smaller than the size of the drawn frame; and executing a redrawing function for redrawing only a portion of the drawn frame based on the calculated second coordinates.

16. A non-transitory computer recording medium that stores a computer program that, when executed by a processor, cause the processor to:

receive a first measured value;

calculate first coordinates for drawing, on a display screen, a figure that is based on the first measured value;

draw on the display screen, based on the first coordinates, a frame that includes the figure that is based on the first measured value;

receive a second measured value;

calculate second coordinates for drawing, on the display screen, a figure that is based on the second measured value;

acquiring coordinates of a redrawing region, which is a region on the display screen that is based on the first coordinates and the second coordinates, the size of the redrawing region being smaller than the size of the drawn frame; and execute a redrawing function for redrawing only a portion of the drawn frame based on the calculated second coordinates.

* * * * *